(12) United States Patent
Schwerdtner

(10) Patent No.: US 8,941,902 B2
(45) Date of Patent: *Jan. 27, 2015

(54) DISPLAY DEVICE FOR DISPLAYING A RECONSTRUCTION OF AN OBJECT

(71) Applicant: SeeReal Technologies GmbH, Dresden (DE)

(72) Inventor: Armin Schwerdtner, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,643

(22) Filed: Jan. 24, 2013

(65) Prior Publication Data

US 2013/0265626 A1 Oct. 10, 2013

Related U.S. Application Data

(63) Continuation of application No. 13/216,761, filed on Aug. 24, 2011, now Pat. No. 8,384,974, which is a continuation-in-part of application No. 11/937,991, filed on Nov. 9, 2007, now Pat. No. 8,027,071, which (Continued)

(30) Foreign Application Priority Data

Nov. 13, 2002 (DE) .................. 102 53 292

(51) Int. Cl.
*G03H 1/08* (2006.01)
*G03H 1/16* (2006.01)
*G03H 1/22* (2006.01)

(52) U.S. Cl.
CPC . *G03H 1/16* (2013.01); *G03H 1/08* (2013.01);
*G03H 1/2294* (2013.01); *G03H 1/2286* (2013.01); *G03H 2001/0858* (2013.01);
(Continued)

(58) Field of Classification Search
None
See application file for complete search history.

(56) References Cited

U.S. PATENT DOCUMENTS 3,957,353 A 5/1976 Fienup et al.
5,191,449 A 3/1993 Newswanger
(Continued)

FOREIGN PATENT DOCUMENTS

GB GB 2 363 273 12/2001
JP 2002-182548 6/2002
(Continued)

OTHER PUBLICATIONS

"Viewing-zone enlargement method for sampled hologram that uses high-order diffraction" Applied Optics vol. 41 No. 8, Mishina et al., 2002.
(Continued)

*Primary Examiner* — Arnel C Lavarias
(74) *Attorney, Agent, or Firm* — Saul Ewing LLP

(57) ABSTRACT

A method of computing a hologram for reconstructing an object using a display device. The display device enables a holographic reconstruction of the object. The display device includes a light source and an optical system to illuminate a hologram-bearing medium being encodable with the hologram. The method includes the steps of: (a) computing the hologram by determining the wavefronts at an approximate observer eye position that would be generated by a real version of the object to be reconstructed; and (b) encoding the computed hologram in the hologram-bearing medium.

37 Claims, 2 Drawing Sheets

Related U.S. Application Data is a continuation of application No. 11/427,640, filed on Jun. 29, 2006, now Pat. No. 7,315,408, which is a continuation of application No. 10/534,877, filed as application No. PCT/DE03/03791 on Nov. 11, 2003, now Pat. No. 7,839,548.

(52) U.S. Cl.
CPC .................. *G03H2001/2236* (2013.01); *G03H 2001/2242* (2013.01); *G03H 2001/2271* (2013.01); *G03H 2222/22* (2013.01); *G03H 2222/34* (2013.01); *G03H 2226/05* (2013.01); *G03H 2210/30* (2013.01)
USPC .......................................................... 359/9

(56) References Cited

U.S. PATENT DOCUMENTS

| | | | |
|---|---|---|---|
| 5,760,933 A | 6/1998 | Aritake et al. | |
| 5,798,864 A | 8/1998 | Sekiguchi | |
| 5,889,599 A | 3/1999 | Takemori | |
| 6,330,088 B1 | 12/2001 | Klug et al. | |
| 6,462,869 B1 | 10/2002 | Gutjahr | |
| 6,665,100 B1 | 12/2003 | Klug et al. | |
| 6,710,920 B1 | 3/2004 | Mashitani et al. | |
| 7,002,619 B1 | 2/2006 | Dean et al. | |
| 7,053,925 B2 | 5/2006 | Payne et al. | |
| 7,230,746 B2 | 6/2007 | Cameron et al. | |
| 7,315,408 B2 * | 1/2008 | Schwerdtner | 359/9 |
| 8,027,071 B2 * | 9/2011 | Schwerdtner | 359/9 |
| 2004/0263930 A1 | 12/2004 | Payne | |
| 2006/0055994 A1 | 3/2006 | Schwerdtner | |
| 2006/0139711 A1 | 6/2006 | Leister et al. | |
| 2006/0238836 A1 | 10/2006 | Schwerdtner | |
| 2006/0238838 A1 | 10/2006 | Schwerdtner | |
| 2006/0238839 A1 | 10/2006 | Schwerdtner | |
| 2006/0238840 A1 | 10/2006 | Schwerdtner | |
| 2006/0238843 A1 | 10/2006 | Schwerdtner | |
| 2006/0238844 A1 | 10/2006 | Schwerdtner | |
| 2008/0252950 A1 | 10/2008 | Schwerdtner | |
| 2010/0067077 A1 * | 3/2010 | Kroll et al. | 359/22 |
| 2012/0188619 A1 * | 7/2012 | Song et al. | 359/9 |

FOREIGN PATENT DOCUMENTS

| | | |
|---|---|---|
| WO | 99/00993 | 1/1999 |
| WO | 00/03309 | 1/2000 |
| WO | 01/95016 | 1/2001 |

OTHER PUBLICATIONS

"Combination enlargement method of viewing zone for computer-generated holography" SPIE vol. 3956 (2000), Mishina et al.
"Electro-holographic Display using 15 mega pixels LCD" SPIE vol. 2652/15, Maeno et al, 1996.
"Expansion of the image size and viewing zone in holographic display using liquid crystal devices" SPIE vol. 2406/283, Fukaya et al, Apr. 1995.
"Eye-position tracking type electro-holographic display using liquid crystal devices" ASIA Display '95, Fukaya et al, 1995.
"Computer-generated Binary Holograms," IBM J.Res Develop, Brown/Lohmann, 1969.
"Characteristics of three-dimensional reconstructed images from a computer generated hologram" Electr. & Comm. In JP vol. 62-C, Onoe/Kaneko, 1979.
"Computational challenges of emerging novel true 3D holographic displays" SPIE vol. 4109 (2000), Cameron, Pain, Stanley, Stinger.
"Introduction to Fourier Optics" p. 118/119, Goodman 2nd Ed, 1996.
"Basic demonstration in diffractive and Fourier optics: use your eye as a Fourier transformer" SPIE vol. 3190, Stijns Erik, 1997.
Office Action, dated May 16, 2007, issued in related German Application No. 103 53 439.3-51 (in German with English translation).
International Search Report, dated May 18, 2004, issued in priority International Application No. PCT/DE03/03791.
English translation of Office Action, dated Aug. 30, 2007, issued in related Korean Application No. 10-2005-7008370.
English translation of Office Action, dated May 25, 2006, issued in related Russian Application No. 2005118086/28.
Office Action, dated Feb. 13, 2007, issued in Singapore Application No. 200502601-8.
English translation of Office Action, dated Jan. 29, 2009, issued in related Korean Application No. 10-2008-7005127.
Examination Report, dated Sep. 2, 2008, issued in Philippine Application No. 1-2005-500748.
English translation of Office Action, dated Dec. 28, 2007, issued in related Chinese Application No. 200380103105.X.
European Search Report, dated Sep. 8, 2005, issued in related European Application No. 03 788 795.7 (German only).
Examination Report, dated Mar. 17, 2006, issued in related Indian Application No. 1221/CHENP/2005.

* cited by examiner

DISPLAY DEVICE FOR DISPLAYING A RECONSTRUCTION OF AN OBJECT

CROSS REFERENCE TO RELATED APPLICATIONS

This application is a continuation of U.S. application Ser. No. 13/216,761, filed Aug. 24, 2011, which is a continuation of U.S. application Ser. No. 11/937,991, filed Nov. 9, 2007, now U.S. Pat. No. 8,027,071, which is a continuation of U.S. application Ser. No. 11/427,640, filed Jun. 29, 2006, now U.S. Pat. No. 7,315,408, which is a continuation application of U.S. application Ser. No. 10/534,877, now U.S. Pat. No. 7,839,548, filed by A. Schwerdtner on May 12, 2005, entitled "Video Hologram and Device for Reconstructing Video Holograms," the contents of which are hereby incorporated by reference.

U.S. application Ser. No. 10/534,877 is, in turn, related to, and claims priority from, PCT Application No. PCT/DE03/03791, filed on Nov. 11, 2003 and to German Patent application DE 10253292.3, filed on Nov. 13, 2002, the contents of both of which are hereby incorporated by reference.

FIELD OF THE INVENTION

The present invention relates to a video hologram and a device for reconstructing video holograms having an optical system that includes at least one light source, a lens and a hologram-bearing medium composed of cells arranged in a matrix or an otherwise regular pattern, with at least one opening per cell, and with the phase or amplitude of the opening being controllable.

BACKGROUND OF THE INVENTION

Devices for reconstructing video holograms using acousto-optical modulators (AOM) are known from prior art, as detailed in, for instance, U.S. Pat. No. 5,172,251 issued to Benton et al. on Dec. 15, 1992 entitled "Three dimensional display system," the contents of which are hereby incorporated by reference. Such acousto-optical modulators transform electric signals into optical wave fronts, which are recomposed in a video frame using deflection mirrors to form two-dimensional holographic areas. A scene visible for the viewer is reconstructed from the individual wave fronts using further optical elements. The optical means used, such as lenses and deflection elements, have the dimensions of the reconstructed scenes. Due to their great depth, these elements are voluminous and heavy. It is difficult to miniaturize them, so that their range of applications is limited.

Another way to generate large video holograms is the so-called "tiling method", using computer-generated holograms (CGH). This method is described in for instance PCT patent publication WO 00/75698 of PCT Patent Application PCT/GB2000/001901 filed on May 18, 2000 by Pain et. al entitled "Holographic Displays" and in U.S. Pat. No. 6,437,919 B1 issued to Brown, et al. on Aug. 20, 2002 "System for the production of a dynamic image for display", both of which are hereby incorporated by reference. In the tiling method, small CGHs having a small pitch are created using an optical system. In the first step of the method, the required information is written to fast matrices that have a small pitch, such as electronically addressable spatial light modulators (EASLM). These fast matrices are then reproduced on to a portion of a suitable holographic medium. A large video hologram is composed of the tiled replicas of the fast matrices. Usually, an optically addressable spatial light modulator (OASLM) is used as holographic medium. In a second step, the composed video hologram is reconstructed with coherent light in transmission or reflection.

In the CGH with controllable openings arranged in a matrix or in an otherwise regular pattern as described in, for instance, PCT publications number WO 01/95016 A1 of PCT patent application PCT/GB2001/002302 filed on May 24, 2001 by Payne et al. entitled "Computation Time Reduction for Three-Dimensional Displays" or in Fukaya et al., "Eye-position tracking type electro-holographic display using liquid crystal devices", Proceedings of EOS Topical Meeting on Diffractive Optics, 1997, the diffraction on small openings is taken advantage of for encoding the scenes. The wave fronts emerging from the openings converge in object points of the three-dimensional scene before they reach the viewer. The smaller the pitch, and thus the smaller the openings in the CGHs, the greater is the diffraction angle, i.e. the viewing angle. Consequently, with these known methods enlarging the viewing angle means to improve the resolution.

As is generally known, in Fourier holograms the scene is reconstructed as a direct or inverse Fourier transform of the hologram in a plane. This reconstruction is continued periodically at a periodicity interval, the extension of the periodicity interval being inversely proportional to the pitch in the hologram.

If the dimension of the reconstruction of the Fourier hologram exceeds the periodicity interval, adjacent diffraction orders will overlap. As the resolution is gradually decreased, i.e. as the pitch of the openings increases, the edges of the reconstruction will be increasingly distorted by overlapping higher diffraction orders. The usable extent of the reconstruction is thus gradually limited.

If greater periodicity intervals and thus greater viewing angles are to be achieved, the required pitch in the hologram comes closer to the wavelength of the light. Then, the CGHs must be sufficiently large in order to be able to reconstruct large scenes. These two conditions require a large CGH having a great number of openings. However, this is currently not feasible in the form of displays with controllable openings, as discussed in, for instance, U.S. Pat. No. 6,831,678 issued to Travis on Dec. 14, 2004 entitled "Autostereoscopic display", the contents of which are hereby incorporated by reference. CGH with controllable openings only measure one to several inches, with the pitches still being substantially greater than 1 μm.

The two parameters, pitch and hologram size, are characterized by the so-called space-bandwidth product (SBP) as the number of openings in the hologram. If the reconstruction of a CGH with controllable openings that has a width of 50 cm is to be generated so that a viewer can see the scene at a distance of 1 m and in a 50-cm-wide horizontal viewing window, the SBP in horizontal direction is about $0.5 \cdot 10^6$. This corresponds to 500,000 openings at a distance of 1 μm in the CGH. Assuming an aspect ratio of 4:3, 375,000 openings are required in the vertical direction. Consequently, the CGH comprises $3.75 \cdot 10^{11}$ openings, if three color sub-pixels are taken into consideration. This number will be tripled if the fact is taken into account that the CGH with controllable openings usually only allows the amplitudes to be affected. The phases are encoded taking advantage of the so-called detour phase effect, which requires at least three equidistant openings per sampling point. SLM having such a great number of controllable openings are hitherto unknown.

The hologram values must be calculated from the scenes to be reconstructed. Assuming a color depth of 1 Byte for each of the three primary colors and a frame rate of 50 Hz, a CGH requires an information flow rate of $50 \cdot 10^{12} = 0.5 \cdot 10^{14}$ Byte/s.

Fourier transformations of data flows of this magnitude exceed the capabilities of today's computers by far and thus do not allow holograms to be calculated based on local computers. However, transmitting such an amount of data through data networks is presently unfeasible for normal users.

In order to reduce the enormous number of computations it has been proposed not to calculate the entire hologram, but only such parts of it that can be seen directly by the viewer, or such parts that change. The kind of hologram which consists of addressable sub-regions, such as the above-mentioned "tiling hologram", is disclosed in the above-mentioned patent specification WO 01/95016 A1. Starting point of the calculations is a so-called effective exit pupil, the position of which can coincide with the eye pupil of the viewer. The image is tracked as the viewer position changes by continuous recalculation of the hologram part that generates the image for the new viewer position. However, this partly nullifies the reduction in the number of computations.

The disadvantages of the known methods can be summarized as follows: Arrangements with acousto-optical modulators are too voluminous and cannot be reduced to dimensions known from state-of-the-art flat displays; video holograms generated using the tiling method are two-stage processes which require enormous technical efforts and which cannot easily be reduced to desktop dimensions; and arrangements based on SLM with controllable openings are too small to be able to reconstruct large scenes. There are currently no large controllable SLM with extremely small pitches, which would be needed for this, and this technology is further limited by the computer performance and data network bandwidth available today.

SUMMARY OF THE INVENTION

The invention is defined in the appended claims. In one implementation, video holograms and devices for reconstructing video holograms with controllable openings according to the present invention are characterized in that in the viewing plane at least one viewing window is formed in a periodicity interval as a direct or inverse Fourier transform of the video hologram, said viewing window allowing a viewer to view a reconstruction of a three-dimensional scene. The maximal extent of the viewing window corresponds to the periodicity interval in the plane of the inverse Fourier transformation in the image plane of the light source. A frustum stretches between the hologram and the viewing window. This frustum contains the entire three-dimensional scene as a Fresnel transform of the video hologram.

The viewing window is limited approximately to and positioned in relation to one eye, an eye distance of a viewer or to another suitable area.

In an implementation, another viewing window is provided for the other eye of the viewer. This is achieved by the fact that the observed light source is displaced or added a second, real or virtual, adequately coherent light source at another suitable position to form a pair of light sources in the optical system. This arrangement allows the three-dimensional scene to be seen with both eyes through two associated viewing windows. The content of the video hologram can be changed, i.e. re-encoded, according to the eye position in synchronism with the activation of the second viewing window. If several viewers view the scene, more viewing windows can be generated by turning on additional light sources.

In another implementation of the device for reconstructing a video hologram, the optical system and the hologram-bearing medium are arranged so that the higher diffraction orders of the video hologram have a zero point for the first viewing window or an intensity minimum at the position of the second viewing window. This prevents the viewing window for one eye to cross-talk the other eye of the viewer or to other viewers. It is thus taken advantage of the decrease in intensity of the light towards higher diffraction orders, which is due to the finite width of the openings of the hologram-bearing medium and/or the minima of the intensity distribution. The intensity distribution for rectangular openings, for example, is a $sinc^2$ function which rapidly decreases in amplitude and forms a $sin^2$ function which decreases as the distance grows.

The number of openings in the display determines the maximum number of values that must be calculated for the video hologram. The transmission of data from a computer or through a network to the display representing the video hologram is limited to the same number of values. The data flow rate does not substantially differ from the data flow rates known from typical displays used today. Now, this will be illustrated with the help of an example.

If the viewing window is reduced, for example, from 50 cm (horizontal) by 37.5 cm (vertical) to 1 cm by 1 cm by choosing a sufficiently low-resolution display, the number of openings in the hologram will drop to 1/1875. The required bandwidth is reduced in the same way during data transmission through a network. Video holograms created with known methods require $10^{12}$ openings, while this number is reduced to $5 \cdot 10^8$ pixels in this example. The scene can be viewed in full through the remaining viewing window. These requirements on pitch and hologram size according to the space-bandwidth product can already be fulfilled by displays available today. This allows the inexpensive realization of large real-time video holograms on displays with large pitches and having a large viewing window.

The viewing window is tracked by mechanically or electronically displacing the light sources, by using movable mirrors or by using light sources which can be adequately positioned in any other way. The viewing windows are displaced according to the displacement of the light source images. If the viewer moves, the light source(s) is (are) spatially displaced so that the viewing windows follow the eyes of the viewer(s). This is to ensure that the viewers can also see the reconstructed three-dimensional scene when they move, so that their freedom of movement is not limited. Several systems are known for detecting the position of the viewers, e.g. systems based on magnetic sensors can be used beneficially for this.

An implementation of this invention also allows the efficient reconstruction of a video hologram in color. Here, the reconstruction is performed with at least three openings per cell, representing the three primary colors. The amplitude or phase of the openings may be controllable, and the openings may be encoded individually for each of the primary colors. Another possibility of reconstructing a video hologram in color is to perform at least three reconstructions one after another, namely for the individual primary colors, using the device of the present invention.

An implementation of this invention allows the efficient generation of holographic reconstructions of spatially extended scenes through controllable displays, such as TFT flat screens, in real-time and providing large viewing angles. These video holograms can be used beneficially in TV, multimedia, game and design applications, in the medical and military sectors, and in many other areas of economy and society. The three-dimensional scenes can be generated by a computer or in any other way.

These and other features of the invention will be more fully understood by references to the following drawings.

BRIEF DESCRIPTION OF THE DRAWINGS

An embodiment of the present invention is illustrated and explained below in conjunction with the accompanying drawings, wherein.

DETAILED DESCRIPTION

A device for reconstructing video holograms comprises the hologram-bearing medium, a sufficiently coherent, real or virtual, point or line light source and an optical system. The video hologram-bearing medium itself consists of cells which are arranged in a matrix or in an otherwise regular pattern with at least one opening per cell, the phase or amplitude of said opening being controllable. The optical system for reconstructing the video hologram can be realized by an optical imaging system known in the art, consisting of a point or line laser or a sufficiently coherent light source.

Figure 1:
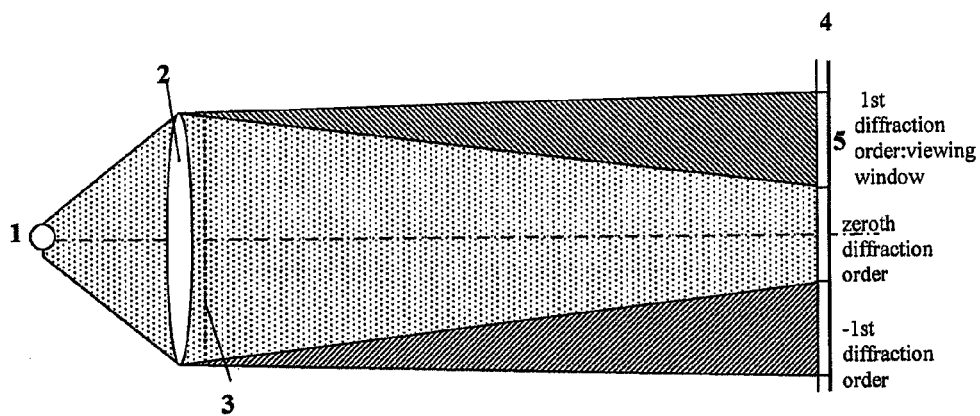
FIG. 1 is a general illustration of a video hologram and a device for reconstructing video holograms showing the generation of the diffraction orders and the position of a viewing window.

FIG. 1 shows the general arrangement of a video hologram and its reconstruction. A light source 1, a lens 2, a hologram-bearing medium 3 and a viewing plane 4 are arranged one after another, seen in the direction of the propagating light. The viewing plane 4 corresponds with the Fourier plane of the inverse transform of the video hologram with the diffraction orders.

The light source 1 is imaged on to the viewing plane 4 through an optical system, represented by the lens 2. If a hologram-bearing medium 3 is inserted, it is reconstructed in the viewing plane 4 as an inverse Fourier transform. The hologram-bearing medium 3 with periodic openings creates equidistantly staggered diffraction orders in the viewing plane 4, where the holographic encoding into higher diffraction orders takes place, e.g. by way of the so-called detour phase effect. Because the light intensity decreases towards higher diffraction orders, the $1^{st}$ or $-1^{st}$ diffraction order is used as the viewing window 5. If not explicitly expressed otherwise, the $1^{st}$ diffraction order will be taken as a basis in the further description of the invention.

The dimension of the reconstruction was chosen here to correspond with the dimension of the periodicity interval of the $1^{st}$ diffraction order in the viewing plane 4. Consequently, higher diffraction orders are attached without forming a gap, but also without overlapping.

Figure 2:
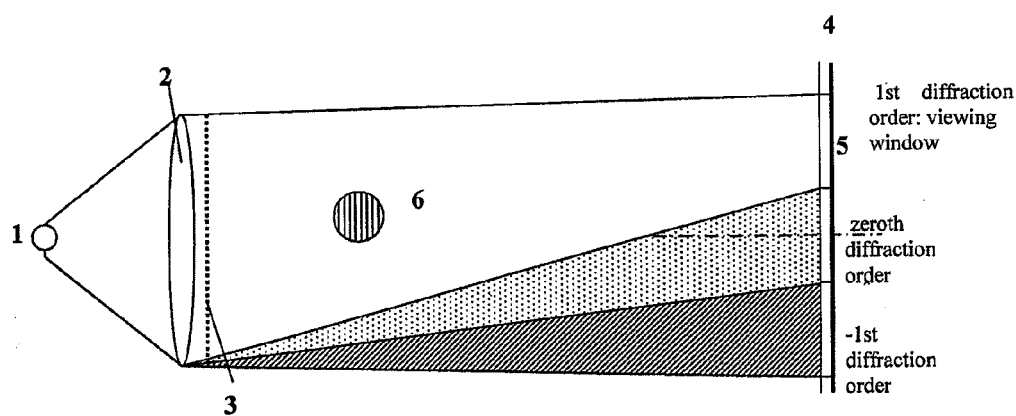
FIG. 2 is a general illustration of a device for reconstructing video holograms showing a three-dimensional scene which can be viewed through a viewing window.

Being the Fourier transform, the selected $1^{st}$ diffraction order forms the reconstruction of the hologram-bearing medium 3. However, it does not represent the actual three-dimensional scene 6. It is only used as the viewing window 5 through which the three-dimensional scene 6 can be observed (see FIG. 2). The actual three-dimensional scene 6 is indicated in the form of a circle inside the bundle of rays of the $1^{st}$ diffraction order. The scene is thus located inside the reconstruction frustum which stretches between the hologram-bearing medium 3 and the viewing window 5. The scene 6 is rendered as the Fresnel transform of the hologram-bearing medium 3, whereas the viewing window 5 is a part of the Fourier transform.

Figure 3:
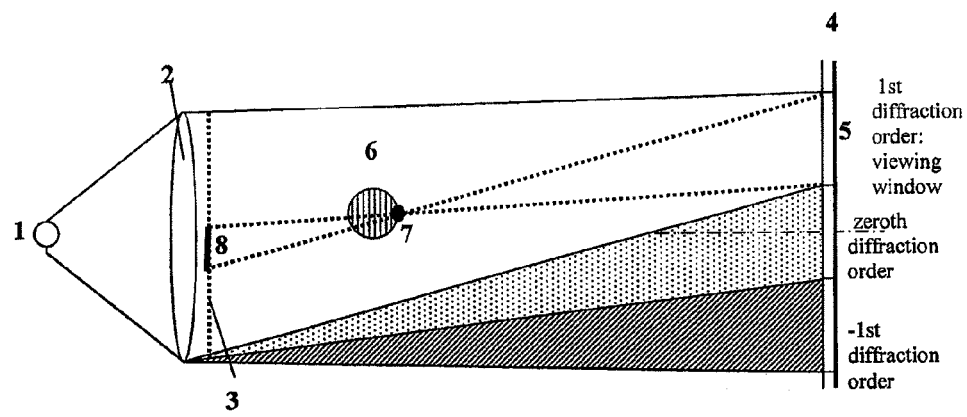
FIG. 3 is a general illustration of a device for reconstructing video holograms showing the encoding of the three-dimensional scene in a part of the video hologram.

FIG. 3 shows the corresponding holographic encoding. The three-dimensional scene is composed of discrete points. A pyramid with the viewing window 5 being the base and the selected point 7 in the scene 6 being the peak, is prolonged through this point and projected on to the hologram-bearing medium 3. A projection area 8 is created in the hologram-bearing medium 3 that point being holographically encoded in the projection area. The distances between the point 7 to the cells of the hologram-bearing medium 3 can be determined in order to calculate the phase values. This reconstruction allows the size of the viewing window 5 to be constrained by the periodicity interval. If, however, the point 7 was encoded in the entire hologram-bearing medium 3, the reconstruction would extend beyond the periodicity interval. The viewing zones from adjacent diffraction orders would overlap, which would result in the viewer seeing a periodic continuation of the point 7. The contours of a surface encoded in this manner would appear blurred due to multiple overlapping.

Figure 4:
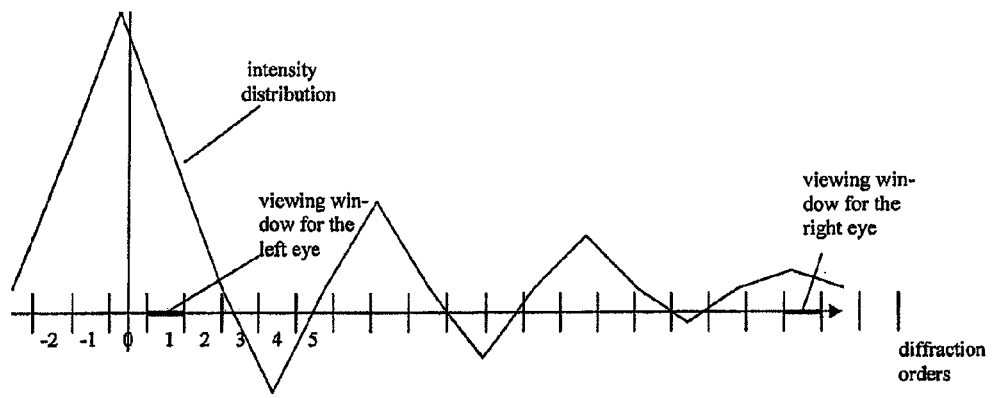
FIG. 4 is a diagram showing the light intensity distribution in the viewing plane depending on the diffraction orders.

The intensity decrease towards higher diffraction orders is taken advantage of to suppress cross-talking to other viewing windows. FIG. 4 shows schematically a light intensity distribution over the diffraction orders, said distribution being determined by the width of the openings in the CGH. The abscissa shows the diffraction orders. The $1^{st}$ diffraction order represents the viewing window 5 for the left eye, i.e. the left viewing window, through which the three-dimensional scene can be viewed. Cross-talking into a viewing window for the right eye is suppressed by the decrease in light intensity towards higher diffraction orders and, additionally, by the zero point of the intensity distribution.

Figure 5:
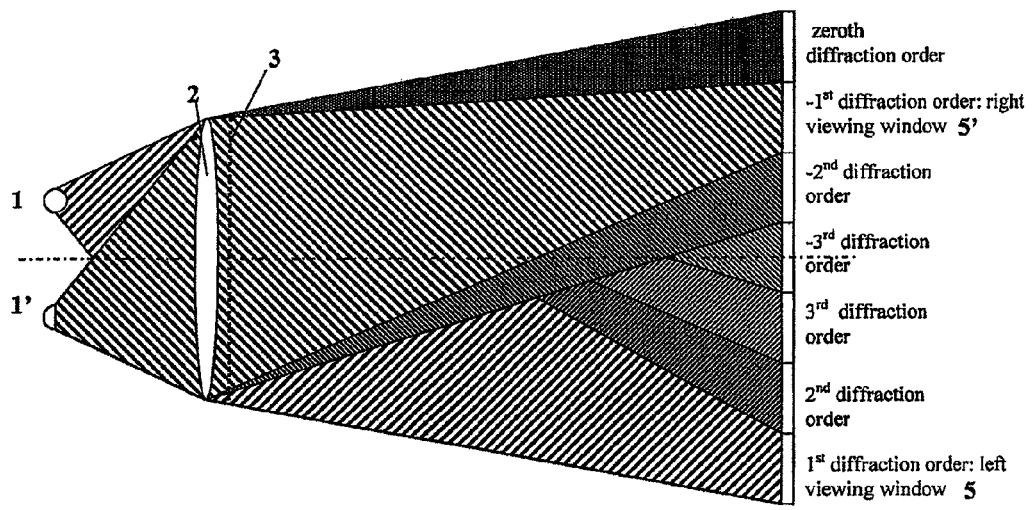
FIG. 5 is a general illustration of a device for reconstructing video holograms showing the position of the viewing windows for both eyes of a viewer with regard to the diffraction orders to prevent cross-talking.

Of course, the viewer can view the scene 6 (not shown in FIG. 5) of the hologram 3 with both eyes (see FIG. 5). For the right eye, the right viewing window 5' represented by the $-1^{st}$ diffraction order of the light source 1' was chosen. As can be seen in the drawing, this light influences the left eye at a very low intensity. Here, it corresponds to the $-6^{th}$ diffraction order.

For the left eye, the $1^{st}$ diffraction order corresponding to the position of the light source 1 was chosen. The left viewing window 5 is formed likewise. According to an implementation of this invention, the corresponding three-dimensional scenes (not shown) are reconstructed using the light sources 1 and 1' in a fix position in relation to the eyes. For this, the hologram 3 will be re-encoded when the light sources 1 and 1' are turned on. Alternatively, the two light sources, 1 and 1', can simultaneously reconstruct the hologram 3 in the two viewing windows 5 and 5'.

If the viewer moves, the light sources 1 and 1' are tracked so that the two viewing windows 5 and 5' remain localized on the eyes of the viewer. The same applies for movements in the normal direction, i.e. perpendicular to the video hologram.

Further, several viewers can view a three-dimensional scene if additional viewing windows are created by turning on additional light sources.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A display device for reconstructing an object, where the display device comprises a light source and an optical system to illuminate a hologram-bearing medium being encodable with holograms, wherein the display device is operable to time sequentially re-encode a hologram on the hologram-bearing medium for a left and then a right eye of an observer.

2. The display device of claim 1, where the display device is adapted to generate two observer windows at an image plane of the light source by providing an appropriate illumination with the optical system and where the hologram on the hologram-bearing medium is re-encoded in synchronism with an activation of an observer window.

3. The display device of claim 1, where the display device is adapted to generate an observer window, the observer window being constrained to be located substantially at an image plane of the light source.

4. The display device of claim 1, where the display device is adapted to generate an observer window, the observer window being smaller than the hologram-bearing medium.

5. The display device of claim 4, where each observer window is approximately 1 cm×1 cm.

6. The display device of claim 1, where the display device is adapted to generate separate observer windows, one for each eye of an observer or where two observer windows are generated simultaneously with a help of two light sources.

7. The display device of claim 1, where the display device is adapted to track a location of an observer's eyes and where a position of an observer window is altered so that the observer can maintain a view through each observer window even when moving his or her head.

8. The display device of claim 1, comprising a position sensor to track a location of the observer's eye or eyes.

9. The display device of claim 1, where the display device is adapted such that the reconstructed object can be anywhere within a volume defined by the hologram-bearing medium and an observer window.

10. The display device of claim 1, where the holographic reconstruction is described by a Fresnel transform of the hologram and not by a Fourier transform of the hologram.

11. The display device of claim 1, where the display device is adapted to generate a direct or inverse Fourier transform of the hologram at an observer plane at which an observer's eyes must be placed.

12. The display device of claim 1, where the hologram-bearing medium is adapted to control a phase or an amplitude.

13. The display device of claim 1, in which the hologram-bearing medium is a TFT flat screen.

14. The display device of claim 1, in which the display device is a television or a multimedia device or a gaming device or a medical image display device or a military information display device.

15. The display device of claim 1, where the light source includes at least one of the following items: several light sources or at least one virtual light source or at least one lineshaped light source or at least one point light source.

16. A method of reconstructing an object using a display device, the display device comprising a light source and an optical system to illuminate a hologram-bearing medium being encodable with holograms, wherein the method comprises the step of:

operating the display device to time sequentially re-encode a hologram on the hologram-bearing medium for a left and then a right eye of an observer.

17. The method of claim 16, further comprising the steps of: (a) computing the hologram by determining wavefronts at an observer eye position that would be generated by a real version of the object to be reconstructed; and (b) encoding the computed hologram in the hologram-bearing medium.

18. The method of claim 16, where two observer windows are provided at an image plane of the light source by providing an appropriate illumination with the optical system and where the hologram on the hologram-bearing medium is re-encoded in synchronism with an activation of an observer window.

19. The method of claim 16, where an observer window is generated, the observer window being constrained to be located substantially at an image plane of the light source.

20. The method of claim 16, where an observer window is generated, the observer window being smaller than the hologram-bearing medium.

21. The method of claim 20, where each observer window is approximately 1 cm×1 cm.

22. The method of claim 16, where separate observer windows are generated, one for each eye of an observer or where two observer windows are generated simultaneously with a help of two light sources.

23. The method of claim 22, where a location of an observer's eyes is tracked and where a position of an observer window is altered so that the observer can maintain a view through each observer window even when moving his or her head.

24. The method of claim 16, where the reconstructed object can be anywhere within a volume defined by the hologram-bearing medium and an observer window.

25. The method of claim 16, where the holographic reconstruction is described by a Fresnel transform of the hologram and not by a Fourier transform of the hologram.

26. The method of claim 16, where a direct or inverse Fourier transform of the hologram is generated at an observer plane at which an observer's eyes must be placed.

27. The method of claim 16, where the hologram-bearing medium controls a phase or an amplitude.

28. The method of claim 16, where the object is a three dimensional scene, the three dimensional scene being made up of multiple discrete points, the method further comprises the steps of: (a) selecting a point in the three dimensional scene to be reconstructed; (b) defining an observer window through which the reconstructed three dimensional scene will be seen; (c) tracing a pyramid from edges of the observer window through the selected point and onto a region that forms only a portion of the hologram-bearing medium; (d) generating, solely in that region of the hologram-bearing medium, holographic information needed to generate the holographic reconstruction of the selected point.

29. The method of claim 16, where the hologram comprises a region with information needed to reconstruct a single point of the object to be reconstructed, the single point being visible from a defined viewing position, where the method further comprising the step of: encoding the region with information for that single point in the reconstructed object, the region being the only region in the hologram being encoded with information for that single point, and the region being restricted in size to form a portion of the entire hologram, the size being such that multiple reconstructions of that single point caused by higher diffraction orders are not visible at the defined viewing position.

30. The method of claim 29, where the region being variable in position and size, the position and size of the region depending on a location of a single point and on a location of a defined viewing position.

31. A sequence of holograms comprising holograms, the holograms being computed according to the method of claim 17.

32. A computer being adapted to compute holograms according to the method of claim 17.

33. A holographic reconstruction generated by the method as defined in claim 17.

34. A hologram-bearing medium for encoding a hologram, the hologram-bearing medium being adapted to be encoded with a hologram being computed according to the method of claim 17.

35. A hologram-bearing medium for a display device of claim 1 for encoding a hologram, the hologram-bearing medium being adapted to be time sequentially re-encoded with a hologram for the left and then the right eye of an observer.

36. A hologram-bearing medium for encoding a hologram, the hologram-bearing medium forming a part of a display device of claim 1.

37. A holographic reconstruction generated by the display device as defined in claim 1.

* * * * *